INVENTORS— G. R. FRANTZ
A. F. POMEROY
BY H. O. Wright
ATTORNEY

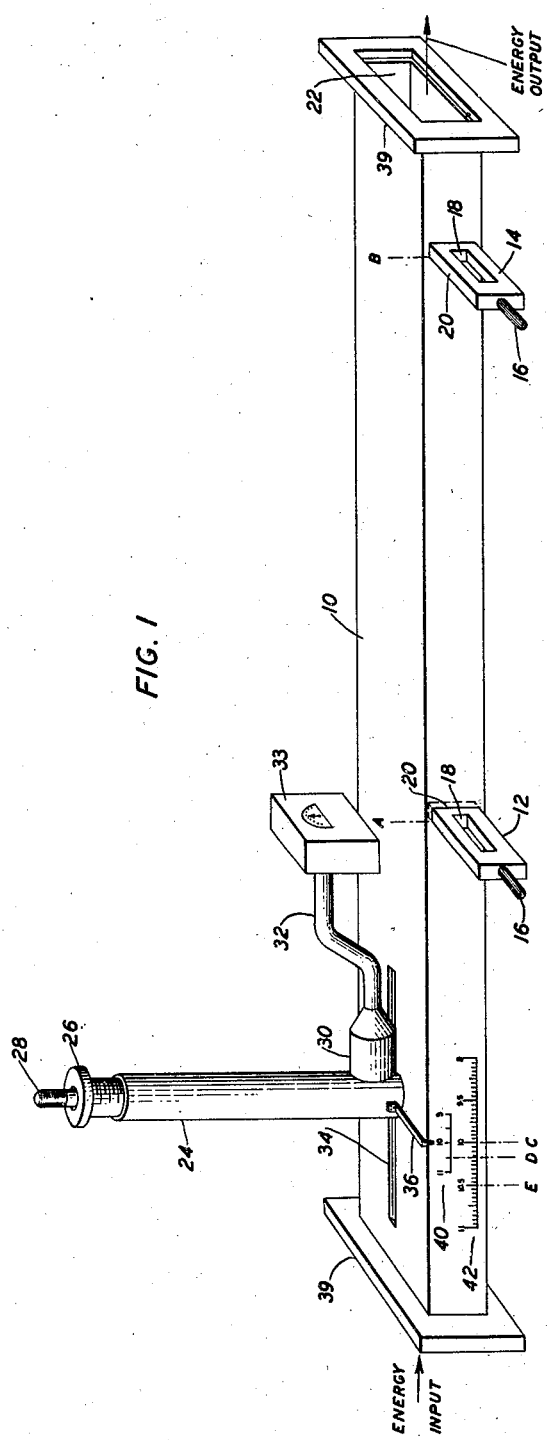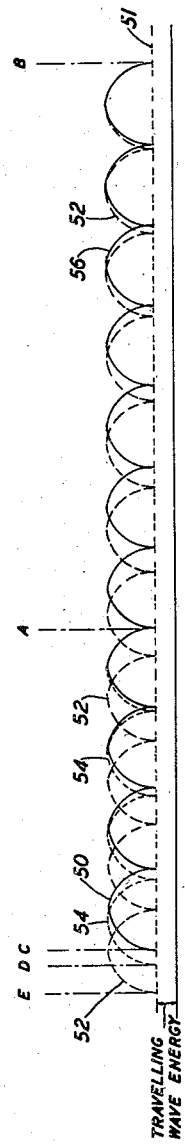

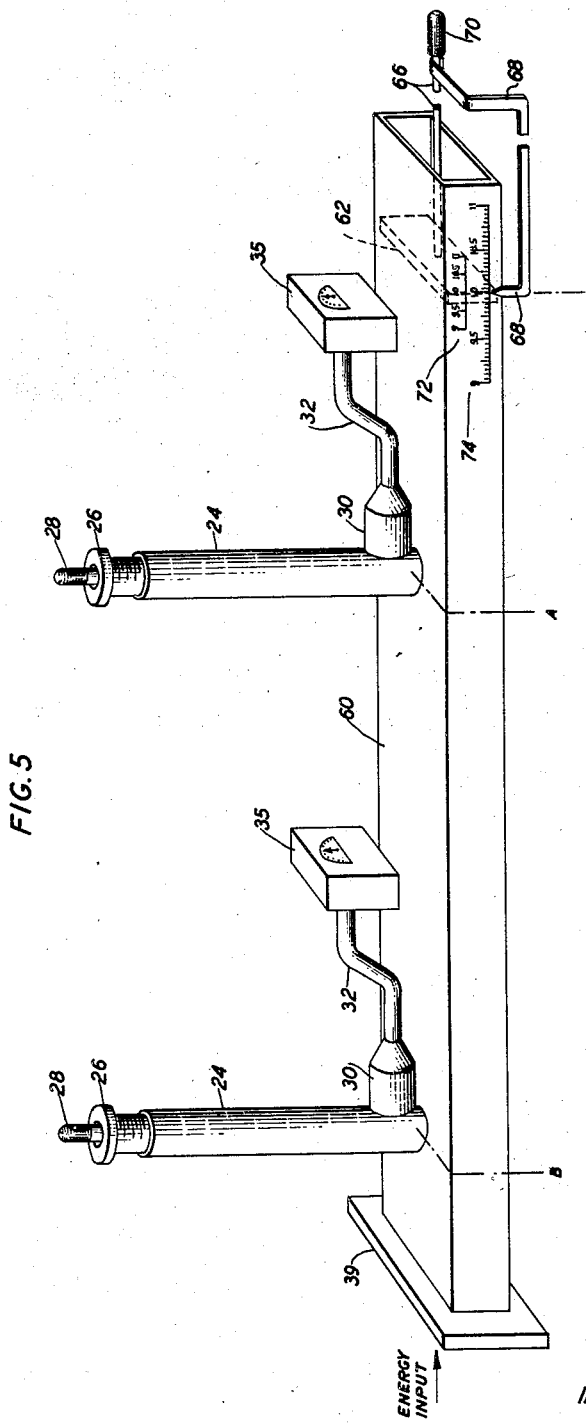
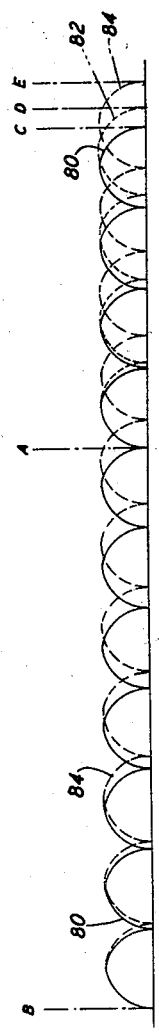
FIG. 5
FIG. 6
INVENTORS— G. R. FRANTZ
A. F. POMEROY
BY Howright
ATTORNEY April 22, 1947.    G. R. FRANTZ ET AL    2,419,208
ULTRA-HIGH FREQUENCY WAVE METER
Filed July 10, 1943    4 Sheets-Sheet 4

INVENTORS—  G. R. FRANTZ
A. F. POMEROY
BY  H. O. Wright
ATTORNEY

Patented Apr. 22, 1947

2,419,208

UNITED STATES PATENT OFFICE 2,419,208

ULTRA HIGH FREQUENCY WAVE METER

Glenn R. Frantz, Port Washington, N. Y., and Allen F. Pomeroy, Bernardsville, N. J., assignors to Bell Telephone Laboratories, Incorporated, New York, N. Y., a corporation of New York Application July 10, 1943, Serial No. 494,176

6 Claims. (Cl. 250—39)

This invention relates to improved ultra-high frequency radio wave-meters. More particularly it relates to ultra-high frequency wave-meters adapted for convenient and accurate measurement of small deviations from a median frequency within a band of ultra-high frequency energy waves. Further it relates to wave-meters which may be readily calibrated to give accurate direct readings of frequency.

The general method of establishing standing waves upon a uniform transmission line by introducing an impedance irregularity at a particular point to produce reflected waves and measuring the distance between consecutive maxima or minima of the standing waves to determine the wavelength, is, of course, well known in the art. This "difference" method, as it is usually employed, is awkward and inconvenient since it usually necessitates the making of several observations and a calculation based on the observations to determine the wavelength. The precision of this method as usually employed is not sufficient for many purposes.

Objects of this invention are to provide improved and simplified methods and structures for determining with a high degree of precision small frequency deviations in an ultra-high frequency wave and to provide structures from which a direct reading of the precise frequency may be obtained by a few simple manipulations and without the necessity of performing calculations.

The steps of the improved method of the invention in one form comprise the establishment of a standing wave by the insertion of an impedance irregularity in an ultra-high frequency transmission line, the determination in sequence of two characteristic points along the standing wave, the first of the points being proximate to the impedance irregularity giving rise to the standing wave and the other being remote therefrom, the determination of the first point serving to provide a first approximation to the frequency to be measured and enabling the second point to be readily located without ambiguity to obtain a precise measure of the frequency, the position of said second point being highly sensitive to small changes in frequency and thus providing a very precise indication of the exact frequency.

In an alternative form, a standing wave is first established by an impedance irregularity inserted a few wavelengths from the normal position of a detecting device to afford a first approximation reading and the first impedance irregularity is then removed and a second standing wave is established by a second impedance irregularity inserted a large number of wavelengths from the normal position of the detecting device to afford an accurate reading of the wavelength.

The principles of the invention will be readily understood from the following detailed description of several illustrative embodiments thereof taken in conjunction with the accompanying drawings in which:

Fig. 1 shows an ultra-high frequency, high precision, direct reading frequency deviation measuring device embodying the principles of the invention in one preferred form;

Fig. 2 indicates the standing wave patterns occurring in the device of Fig. 1 and will be employed in illustrating the operation thereof to provide for the determination of frequency variations with a high degree of precision;

Fig. 5 shows a second preferred form of ultra-high frequency, high precision, direct reading frequency deviation measuring device of the invention;

Figure 7:
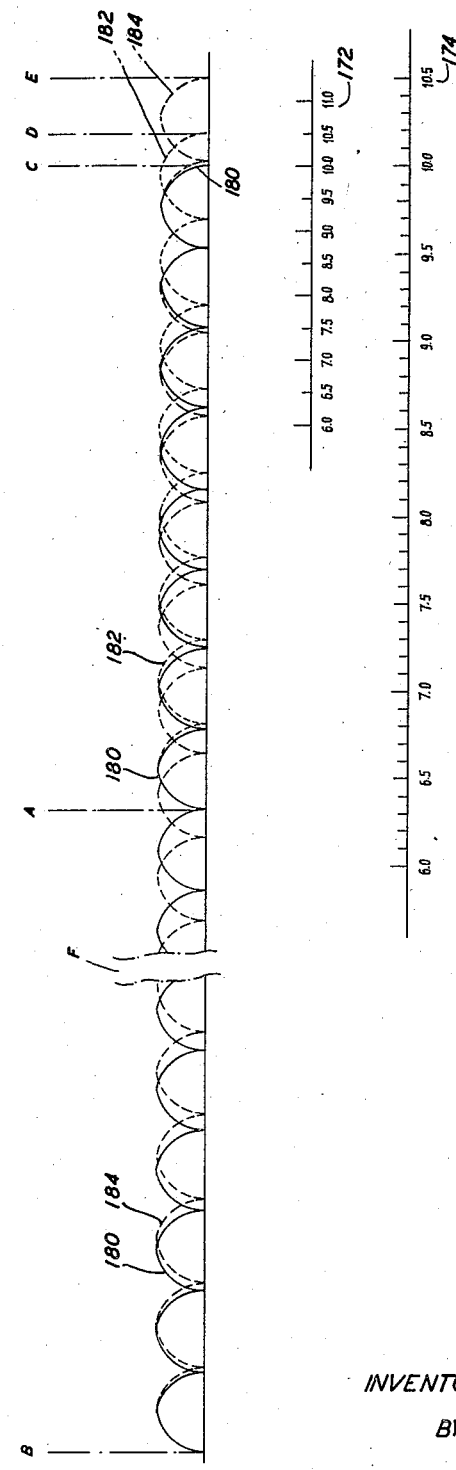

Fig. 6 indicates the standing wave patterns occurring in the device of Fig. 5; and Fig. 7 illustrates the wave pattern for a device of the invention giving a greater degree of precision and the method of obtaining pilot and high precision scales for devices of the invention which do not overlap.

In more detail, in Fig. 1, the section of wave guide 10 is provided with a flange 39 at each end and may conveniently be clamped to similar sections of wave guide or to terminating devices by means of these flanges and corresponding flanges on the apparatus to be connected therewith.

At point C along wave guide 10, an ultra-high frequency detector 24 is shown and includes a small probe which protrudes a short distance into the channel of the wave guide. A preferred form for detector 24 will be described in detail hereinunder in connection with Fig. 4. Detector 24 is slidable along wave guide 10, its probe extending through slot 34 into the wave guide. A coaxial line 32 conveys the video output of detector 24 to an indicator 33 which may be a simple microammeter to indicate maximum output, or, alternatively, a cathode ray oscilloscope to show wave shape as well as amplitude, as will be described in connection with Fig. 3.

At point A of wave guide 10 a reflecting member 12 is positioned. Point A is, in the illustrative embodiment of Fig. 1, precisely four half wavelengths of the median frequency of the frequency range of interest from point C the latter being the median point of scales 40 and 42 on the front of wave guide 10 and the median point of the range through which detector 24 may be adjusted longitudinally along the wave guide.

Reflector 12 is provided with a handle 16 and may be pushed into the guide 10 or withdrawn therefrom by its handle. When fully withdrawn the inner edge of reflector 12 is flush with the inner surface of the wave guide and completely fills the slot 20 in the front of the guide through which it is inserted and withdrawn. Reflector 12 preferably is made to have a tight sliding fit with the inner surfaces of the wave guide so as to make good electrical contact around its entire periphery when within the guide. It is provided with a window or slot 18 centrally located therein in order to pass part of the energy being transmitted along the guide so that an indicating device associated with terminating apparatus of suitable impedance can be employed, if desired, to show the presence of energy and its wave shape in the system. Alternatively, a cathode ray oscilloscope can be substituted for the meter 33 of Fig. 1, as will be described in connection with Fig. 3 below, and the travelling wave energy will then serve to provide a signal the wave shape of which can be observed on the oscilloscope even when the detector position corresponds to a minimum point of the standing wave. If only frequency is to be measured the window or slot 18 is preferably omitted as extremely precise measurements can then be more readily made.

A second reflecting member 14, provided with a handle 16 and having a central slot or window 18 is positioned at point B and is similar in details and operation with that at point A. Point B is, in the illustrative embodiment of Fig. 1, precisely eleven half wavelengths of the medium frequency of interest from point C. The operation of the device of Fig. 1 will be explained in conjunction with the standing wave diagrams of Fig. 2.

In Fig. 2, assuming that ultra-high frequency energy of precisely the median frequency of the range of interest is being introduced into the left end of wave guide 10, Fig. 1, and that reflector 12 has been inserted into wave guide 10 and reflector 14 has been withdrawn; no standing waves will be present in the guide to the right of point A, it being further assumed that the right end of the guide 10 is connected to a terminating apparatus presenting a purely resistive impedance which closely matches that of the guide 10 and, therefore, reflects no energy. A standing wave will, however, arise by virtue of reflection from reflector 12 and is represented by solid line curve 50, and since point A has been precisely fixed at four half wave lengths of the median frequency from the median position at point C of the detector 24, a minimum point of the standing wave 50 will occur at point C. The energy passing through the wave guide, is, of course, a travelling wave of substantially uniform energy level and is represented by the dotted line 51. The purpose of this wave is to provide video frequency energy by means of which the pulse shape can conveniently be observed in an oscilloscope as will be described in detail in connection with Fig. 3.

If the pulse shape is not of interest somewhat sharper zero-points and a slightly increased accuracy and ease of operation can, as mentioned above, be obtained by using reflecting members having no apertures therein so that substantially perfect reflection is obtained without any residue of travelling wave energy.

Should the frequency of the energy introduced into wave guide 10 deviate from the median frequency, however, a standing wave of the new frequency and wavelength such as dotted line curve 54 will be established to the left of reflector 12. Since, as illustrated, wave 54 is slightly longer than median wave 50, the minimum at four half wavelengths from point A will for the new wave be displaced to the left of point C by an amount equal to four times the increase in the length of a single half wavelength and will fall at some point such as D. The distance from C to D will be a measure of the amount by which the frequency has changed and a calibrated scale such as scale 40 of Fig. 1 from which the new frequency may be read directly, can be placed on guide 10 as illustrated in Fig. 1.

For large frequency variations this scale will provide a reasonably good first approximation to the new frequency and will serve as a guide or "pilot" scale in making a further measurement for determining the frequency more accurately. To obtain increased accuracy reflector 12 may now be withdrawn and reflector 14 inserted at point B in the guide. If the input frequency is precisely the median frequency of the range of interest, a standing wave represented by solid line curve 56 having a minimum (the eleventh) occurring precisely at point C will again be obtained. But if the deviation in frequency has occurred, such as that which resulted in standing wave 54 forming at reflector 12, when inserted at point A, a standing wave represented by the dash curve 52 will result from reflector 14, when inserted at B, and since B was fixed at eleven half wavelengths from point C, wave 52 will have its eleventh minimum to the left of point C at some point E which is displaced from point C by eleven times the deviation of one-half wavelength, and since the displacement is greater, the change in frequency, and the new frequency, can be more accurately determined. A second calibrated scale 42 for use with the reflector 14 is, therefore, provided on the wave guide 10 as indicated in Fig. 1. Scale 42 will, as is apparent from the above description, have for the case described the same median point C as scale 40, but any two calibration marks on scale 42 will be separated by a distance greater by the ratio of 11:4 than that between the two corresponding marks of scale 40. Obviously, the frequency deviation can be determined with a substantially higher degree of precision from scale 42. Obviously, also, even higher degrees of accuracy can be obtained, if desired, by employing a longer section of wave guide and a reflecting member still more remote from the detector.

For highly precise readings, in fact, considerably longer wave guide sections are desirable, the length illustrated in Figs. 1 and 5 being chosen principally because it could be more clearly shown in the limited size drawing convenient for use in connection with patent applications. An arrangement involving double the number of half wavelengths of that of Figs. 1 and 5 will be discussed in connection with Fig. 7 from which it will be obvious that a corresponding increase in precision will result.

Since for relatively large frequency variations the tenth and possibly other minima may fall between points C and E, the first approximation or "pilot" scale reading obtained by using the near reflector 12 serves as a guide to determine where the desired eleventh minimum is to be found along scale 42 and thus eliminates possible error or ambiguity. Of course, if the deviation is in the opposite direction from that chosen above (i. e., toward a shorter wavelength or higher frequency) the fourth minimum for reflector 12 and the eleventh minimum for reflector 14 will fall to the right of median point C and again the first approximation obtained by use of reflector 12 and scale 40 will indicate approximately where the desired eleventh minimum will be found along scale 42 when using reflector 14 and will again eliminate possible error or ambiguity.

Figure 3:
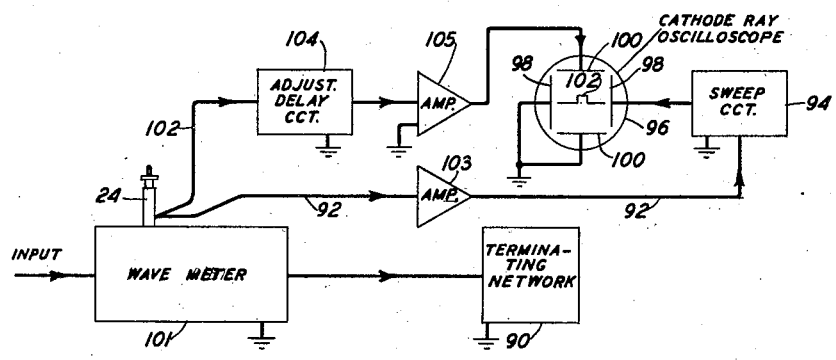
Fig. 3 illustrates in block schematic diagram form a circuit to provide a pattern of the video frequency modulation of an ultra-high frequency energy wave passing through the frequency measuring device of the invention.

In Fig. 3, wave-meter 101 is preferably the device of Fig. 1, including detector 24 and is employed to determine frequency deviations. Its output end is connected to a wave guide terminating device 90 which can be of the general type described in United States Patent 2,106,768, issued February 1, 1938, to G. C. Southworth at page 3, column 2, lines 14 to 24. A portion of the detector output of wave-meter 101 is amplified in amplifier 103 and transmitted to sweep circuit 94 via transmission lines 92 and serves to control the initiation of the sweep voltage variation wave which may be, for example, of conventional saw-tooth shape and is applied by circuit 94 to the horizontal deflecting plates 98 of cathode ray oscilloscope 96. The remainder of the video signal detector output of wave-meter 101 is transmitted via transmission line 102 and passed through a delay circuit 104 which can conveniently be adjustable and which provides time for the sweep circuit to be triggered by energy from transmission line 92 as above described. The output of delay circuit 104 is passed through video frequency amplifier 105 and applied to the vertical deflection plates of oscilloscope 96 and the over-all system is adapted to provide a pictorial representation of the wave shape of energy pulses or similar periodic phenomena introduced into the wave-meter 101. Trace 102 represents a square-topped energy pulse and the delay in circuit 104 is preferably adjustable, as above mentioned, so that the pulse can be readily centered on the target of the oscilloscope. For the determination of frequency deviation, detector 24 is adjusted longitudinally as described in connection with Fig. 1 for minimum readings or pulse heights, first with reflector 12 in the guide and then with reflector 14 in the guide.

Figure 4:
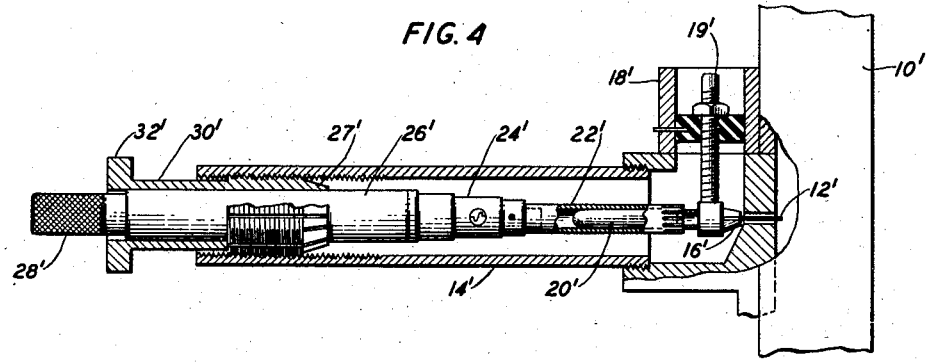
Fig. 4 shows a preferred form of tunable video frequency detector for use in the frequency measuring devices of the invention.

In Fig. 4 a completely tunable, ultra-high frequency crystal detector unit of the type described in copending application of W. H. Hewitt, Jr., Serial No. 505,763, filed September 25, 1943, is shown. Fig. 4 is, in fact, identical with Fig. 1 of the Hewitt application except that the designation numbers are primed to distinguish them from like numbers employed in the present application.

In Fig. 4 wave guide 10' is, for example, of rectangular cross-section as for wave guides described in United States Patent 2,129,669, issued September 13, 1938, to A. E. Bowen, and is assumed, by way of illustration, to be conducting an ultra-high frequency wave which may be either a continuous wave modulated by a video wave or a pulsed wave modulated by a video wave.

The structure directly to the left of wave guide 10', including probe 12' extending slightly into the guide, comprises a preferred form of video modulation detector. It consists of a section of concentric transmission line having an outer conductor 14' and an inner conductor consisting of conducting member 26', crystal detector 24' and conducting members 22', 20' and 12'. A short-circuiting member 30' connects through slidable contacting fingers 27', the member 26' and the outer conductor 14'. The position of member 30' is adjustable longitudinally by means of a threaded portion which engages threads on the inside of member 14' as shown. A ring-shaped knob 32' on its left end facilitates turning member 30'. By this arrangement the section of concentric line is tuned to the ultra-high frequency being transmitted through guide 10'.

Detector 24' comprises, preferably, a small crystal of silicon in a conductive mounting attached to member 22', a "cat's whisker" in a second conductive mounting attached to the right end of member 26' and a porcelain tubular member holding the two mountings suitably spaced in a unitary assembly. The "cat's whisker" is adjusted, of course, to provide maximum sensitivity of detection as is well known to those skilled in the art.

At the right end of member 22' is a tube including contacting fingers at its right end which slide over the member 20'.

Member 20' is held in position by ring member 15' on the end of conductor 19' which is the inner conductor of a coaxial pair comprising the video output leads. These are proportioned to constitute a transmission line having a substantially constant resistive impedance over the frequency range of interest. A convenient impedance for such lines is 70 ohms.

The line will normally be extended as may be required for convenient connection to an indicator of a type suitable for providing the kind of indication desired.

For the determination of minima points of standing waves in frequency measuring systems a simple microammeter will suffice.

For the determination of wave shapes a cathode ray indicator is usually employed. One arrangement using a cathode ray indicator to determine wave shape has, of course, been described above and is illustrated in Fig. 3.

The indicator used should preferably have an input impedance matching that of the coaxial line. Numerous ways of modifying the input impedance of such devices, as may be required to provide the desired impedance are, of course, well known to those skilled in the art.

At the right end of member 20' is another tubular opening with contacting fingers 16' at its right end which hold the small probe 12' and permit the probe to be adjusted longitudinally to accurately fix its protrusion into the wave guide 10'. Member 26' extends to the left through contacting finger members 27' of shorting plug 30' and is provided with a knob 28' on its free end to facilitate independent longitudinal adjustment of member 26'. As is apparent from the above description, adjustment of member 26' will also effect the longitudinal positioning of crystal detector 24' the fingers of the tube of member 22' maintaining contact with member 20' as member 26' is moved longitudinally. The operation of the over-all structure is explained in detail in the above-mentioned application of W. H. Hewitt, Jr.

In Fig. 5 a second form of structure employing the principles of the invention is shown. This structure differs from that of Fig. 1 principally in that a single reflecting member 62 adjustable longitudinally near the right end of the section of wave guide 60 is used in cooperation with two ultra-high frequency detectors 24, the detectors being fixed at precisely four and eleven half wavelengths, respectively, of the medium frequency of the range of interest to the left of the median position of reflector 62, as indicated in Fig. 5. Also the reflecting member 62 completely closes the wave guide so that no residual travelling wave energy is present in wave guide 60.

With the device of Fig. 5, designating the median position of the reflector 62 as C and the positions of the two detectors 24 as A and B, respectively, and with a wave of the median frequency being introduced into the left end of the wave guide 60, a minimum will be observed to exist at points A and B when the reflector is at point C. The standing wave established is represented by solid line curve 80 of Fig. 6. For a deviation toward a longer wavelength reflector 62 will have to be moved longitudinally to the right by means of rod 66, having handle 70 and carrying pointer 68, to some position such as D of Fig. 6 to produce a minimum at point A. A calibrated "pilot" scale 72 is provided associated with pointer 68 from which the approximate deviation in frequency or change in wavelength can be directly read. The information thus obtained will enable the operator to determine approximately where, with reference to the expanded scale 74, the reflector 62 should be placed to cause the eleventh minimum of the standing wave to fall at point B. Final adjustment is, of course, made by adjustment to bring the reading of indicator 35 associated with the left detector, to minimum value and the deviation, or new frequency, can then be read to a high degree of precision from scale 74. With reference to Fig. 6, the dotted line curve 82 represents the standing wave for a given frequency deviation which produces a minimum at point A and the dash-line curve 84 represents the standing wave for the same frequency deviation which produces a minimum at point B. For these two conditions the reflector 62 must be moved to positions D and E, respectively, of Fig. 6.

The section of wave guide 60 is preferably provided with a flange 39 at its input end to facilitate connection to a wave guide transmission line. Rod 66 and pointer 68 extend sufficiently from the right end of wave guide 60 to permit adjustment over the maximum frequency deviation range to be measured.

Obviously, rack and pinion or similar drive mechanisms facilitating the longitudinal adjustment of detector 24 of Fig. 1 or reflector 62 of Fig. 5 can readily be devised by a skilled mechanic, if desired.

As for the device of Fig. 1, greater precision can be obtained with the device of Fig. 5, if desired, by employing a greater number of half wavelengths in the precision measurement i. e., by locating the detector of point B at a greater distance in half wavelengths of the median frequency from the median position of reflector 62 and the accuracy of the "pilot" indication, giving the first approximation as described above, can be increased by increasing the number of half wavelengths employed in obtaining it.

By way of example, Fig. 7 illustrates the standing wave patterns corresponding to a device identical with that of Fig. 5 except point A, where the first detector is located, is eight half wavelengths from point C, the median or reference position of the slidable reflecting member, and point B where the second detector is located, is twenty-two half wavelengths from point C, a break at F representing intervening half wavelengths, omitted in order to bring point B within the limited space of the drawing.

As for the device of Fig. 5, the solid line curve 180 represents the median or reference frequency wave and with the reflector at point C the eighth and twenty-second minima will fall at points A and B, respectively, but if the wavelength increases, the new wave 182 will require that the reflector be adjusted to point D to cause the eighth minima to fall at point A and to point E to cause the twenty-second minima to fall at point B, respectively.

As is obvious from inspection of Figs. 5 and 7, both scales 172 and 174 of Fig. 7 provide a higher degree of accuracy than the corresponding scales 72 and 74, respectively, of Fig. 5.

A further feature illustrated by the scales 172 and 174 of Fig. 7 is that the reference frequency or frequency at which both scales have the same value (i. e., 10.0 in the case illustrated) can be so chosen with respect to the desired range of operation that the used portions of the two scales 172 and 174 will not overlap. For example, if it is desired to measure frequencies falling in the range lying between 6.0 and 8.0 on these scales, the portion 6.0 to 8.0 of scale 174 is sufficiently displaced with respect to the corresponding portion of the scale 172 that no overlapping of these scale portions occurs. As a practical matter it may be desirable to choose the reference point in this way so that all possibility of confusion and errors resulting from reading the wrong scale will be eliminated. Furthermore, if a rack and pinion drive is employed to adjust the position of the reflecting member, a dial affixed to the axle of the pinion can carry the two scales sequentially on its face and only the scale desired for the particular operating being performed will be presented adjacent a fixed index mark employed to indicate the point at which the scale should be read.

The above-described structures are illustrative of the application of the principles of the invention. Numerous other embodiments thereof will readily occur to those skilled in the art. The scope of the invention is defined in the following claims.

What is claimed is:

1. In an ultra-high frequency system, a device for determining with high precision small deviations from a reference frequency comprising a first means for determining a definite few half wavelengths of the frequency to be measured, a second means for determining a definite larger number of half wavelengths, a third means cooperatively associated with said first means comprising mechanical means for directly indicating the approximate proper setting of said second means and a fourth means cooperatively associated with said second means for reading the frequency deviation directly to a high degree of precision.

2. In an ultra-high frequency system a high precision direct-reading frequency measuring device comprising a uniform section of wave guide transmission line capable of freely transmitting the entire range of frequencies of interest and exceeding in length eleven half wavelengths of the lowest frequency of interest, an ultra-high frequency detector loosely coupled to said wave guide near one end thereof and adjustable longitudinally along the wave guide for a distance in both directions from a reference position exceeding eleven times the maximum wavelength deviation to be measured, a first reflecting member adapted for insertion in and withdrawal from said wave guide at a position four half wavelengths of the mean frequency of the range of frequencies of interest from the reference position of said detector and toward the center of said section of wave guide, a second like reflecting member positioned on the same side of said detector but at a distance of eleven half wavelengths of the mean frequency of the range of interest from the reference position of the detector, a first scale and a second scale associated with said detector, said scales being calibrated to read frequency directly, the first scale being calibrated for changes resulting in the position of the minimum of the standing wave established nearest the detector by inserting only said first reflecting member in said wave guide, and the second scale being calibrated to show the position of the corresponding eleventh minimum of the standing wave established by inserting only said second reflecting member in said wave guide whereby an observation taken with said first reflecting member only inserted in the wave guide, indicates the approximate proper setting of the detector on said second scale to determine the eleventh minimum of the standing wave resulting from the insertion of the second reflecting member only and the frequency can then be read directly with a high degree of precision from said second scale, by adjusting the detector to the said eleventh minimum.

3. In an ultra-high frequency system, a high precision, direct-reading, frequency measuring device comprising a uniform section of wave guide transmission line capable of freely transmitting the entire range of frequencies of interest exceeding eleven half wavelengths long, a reflecting member in said wave guide near one end thereof, an adjustment mechanism for moving said member longitudinally along the wave guide for a distance in both directions from a reference position exceeding eleven times the maximum wavelength deviation to be measured, a first ultra-high frequency detector loosely coupled to said wave guide at a position four half wavelengths of the mean frequency of the frequency range of interest from the reference position of said reflecting member toward the center of said wave guide section, a second ultra-high frequency detector loosely coupled to said wave guide at a position eleven half wavelengths of the mean frequency of the frequency range of interest from the reference position of said reflecting member on the same side of said reflecting member as said first detector, a first calibrated scale and a second calibrated scale, the first calibrated scale being associated with the adjustment mechanism of said reflecting member to indicate deviation from the reference position of four half wavelengths of the frequency being measured, the second calibrated scale being similarly associated with the adjustment mechanism of said reflecting member to indicate deviation from the reference position of eleven half wavelengths of the frequency being measured whereby an indication may be obtained from said first calibrated scale as to the approximate position on the second calibrated scale for which the eleventh minimum of the standing wave induced by said reflecting member will be aligned with said second detector and by final adjustment with respect to said second calibrated scale the deviation of the frequency from the reference frequency may be determined with a high degree of precision.

4. In a high frequency system, a device for determining the frequency with high precision which comprises a first means for determining a definite few half wavelengths of the frequency to be measured, a second means for determining a definite larger number of half wavelengths, a third means cooperatively associated with said first means for directly indicating the approximate proper setting of said second means and a fourth means cooperatively associated with said second means for reading the frequency directly to a high degree of precision.

5. In a high frequency system, a high precision, direct-reading, frequency measuring device comprising a uniform section of transmission line capable of freely transmitting the entire range of frequencies of interest, said line being a large number of wavelengths long, means for establishing in said transmission line, standing wave energy of the frequency to be measured, means for determining the frequency as indicated by a few half wavelengths of said standing wave, means for determining the frequency as indicated by a large number of half wavelengths of said standing wave, means for indicating from the first frequency determination the approximate adjustment required for the second frequency determination, and means for reading the frequency directly with a high degree of precision when said second frequency determination has been made.

6. A wave energy frequency measuring device comprising a uniform transmitting path for said wave energy a large number of wavelengths long, means for establishing a standing wave of said wave energy in said path, a first means for measuring a few half wavelengths of said standing wave, a second means for measuring a large number of wavelengths of said standing wave, a third means, cooperatively associated with said first means, for directly indicating the approximate proper adjustment of said second means and a fourth means cooperatively associated with said second means for directly reading the frequency of said wave with a high degree of accuracy.

GLENN R. FRANTZ.
ALLEN F. POMEROY.

REFERENCES CITED

The following references are of record in the file of this patent:

UNITED STATES PATENTS

| Number | Name | Date |
|---|---|---|
| 1,920,304 | Hansell | Aug. 1, 1933 |